United States Patent Office 2,801,227
Patented July 30, 1957

2,801,227

PROCESS FOR MANUFACTURE OF GLYCIDYL ETHERS OF POLYHYDRIC PHENOLS

Johan M. Goppel, Amsterdam, Netherlands, assignor to Shell Development Company, Emeryville, Calif., a corporation of Delaware No Drawing. Application October 19, 1953, Serial No. 387,037

8 Claims. (Cl. 260—46)

This invention relates to an improved process for the manufacture of glycidyl ethers of polyhydric phenols. More particularly, the invention pertains to a method for producing the glycidyl ethers in high yields.

Glycidyl ethers of polyhydric phenols which have substantially all of the phenolic hydroxyl groups of the phenol replaced by glycidyloxy groups have been produced heretofore by several methods. For example, an aqueous solution of base has been added to a solution of polyhydric phenol in excess epichlorhydrin, the addition being conducted gradually so the reaction mixture does not become strongly basic. While this method gives the desired product, the presence of the large proportion of water in the reaction mixture has been found to result in considerable formation from epichlorhydrin of by-product material with consequent loss of yield of desired product on the basis of the epichlorhydrin consumed. Another method used is addition of solid flake sodium hydroxide to a solution of polyhydric phenol in excess epichlorhydrin, the caustic being added in portions during the course of the reaction. This method also has been found to suffer a relatively large loss of epichlorhydrin to by-products including resinous polymer of glycidol which may form by contact of the hot epichlorhydrin with the strongly basic solid sodium hydroxide.

It is apparent for obvious reasons that large scale commercial production of glycidyl ethers of polyhydric phenols necessitates that the yield of product from epchlorhydrin be as high and as near theoretical as possible. I have now discovered a new method for producing glycidyl ethers of polyhydric phenols which enables the product to be obtained in improved high yields with respect to epichlorhydrin.

According to the process of my invention, glycidyl ether of a polyhydric phenol is produced by adding an aqueous solution of alkali metal hydroxide containing at least 15% by weight of the hydroxide to an agitated solution of polyhydric phenol dissolved in at least 3 mols of epichlorohydrin per phenolic hydroxyl equivalent of the phenol while distilling water along with epichlorhydrin from the reaction mixture with condensation of the distilled vapors as distillate which separates into two layers or phases and returning only the epichlorhydrin rich layer to the reaction mixture, preferably substantially as fast as collected, the rate of addition of the hydroxide solution and the rate of distilling being so regulated that the reaction mixture contains from about 0.3 to 2% by weight of water. The yield of product based upon epichlorhydrin obtained by this process of mine is greater than 90%, and at times exceeds 95%.

The reaction involved in producing the glycidyl ether by the process may be written as:

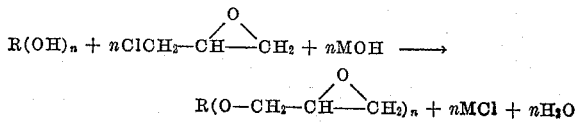

wherein $n$ is a value of at least 2 which denotes the number of phenolic hydroxyl groups contained in a molecule of the polyhydric phenol, R is the organic radical to which the phenolic hydroxyl groups are linked in the phenol, and MOH and MCl are the alkali metal hydroxide and the formed alkali metal chloride, respectively. It will be seen from the above reaction that the water removed from the reaction mixture in the process comes not only from the added aqueous solution of caustic, but also is formed by the reaction. In order to obtain the high yield of product, it is essential that the reaction mixture contain only from about 0.3 to 2% by weight of water during the course of the reaction. If the reaction mixture becomes substantially anhydrous, the desired reaction does not occur. If the reaction mixture contains more than about 2% of water, formation of undesired by-products resulting in excessive loss of epichlorhydrin occurs. Best results are obtained when the concentration of water in the reaction mixture is maintained at from about 0.5 to 1% by weight.

The concentration of water in the reaction mixture is readily maintained within the desired range by control of two features in the process: (1) the rate of addition of the aqueous hydroxide solution, and (2) the rate of distilling the water and epichlorhydrin from the reaction mixture. While the aqueous hydroxide is being added, the distilling should be conducted vigorously. The rate of introduction of the hydroxide solution is regulated so that the temperature of the reaction mixture is maintained substantially constant within about 105 to 115° C. at atmospheric pressure, excellent results being obtained at about 106° C. Correspondingly lower or higher temperatures are used if operation is at subatmospheric or superatmospheric pressure which can be used if desired.

The process is normally executed in a reaction vessel equipped with a mechanical stirrer, a valved entrance vessel for feeding in the aqueous hydroxide solution, means for measuring the temperature of the reaction mixture, heating means, and a vapor outlet fitted with a condenser and vapor temperature measuring device. Condensed distillate from the condenser is arranged to be conducted to a separating chamber wherein separation to an aqueous layer and an epichlorhydrin layer occurs. A return is provided to conduct the epichlorhydrin layer back to the reaction mixture while a discharge enables removal of the aqueous layer to a collection tank. Although not necessary, the apparatus may have a fractionating column between the vapor outlet from the reaction vessel and the condenser. The use of the fractionating column is usually not preferred because the hold up of epichlorhydrin in the column reduces its concentration in the reaction mixture where a high concentration is desirable.

The distilled vapor leaving the reaction mixture contains both water and epichlorhydrin owing to the azeotropic behavior which has been found. The condensed vapor is not necessarily the equilibrium azeotrope of epichlorhydrin and water since the boiling reaction mixture is too deficient in water. Nevertheless upon being condensed, the distillate separates into an upper aqueous layer and a lower epichlorhydrin layer. The separation is effected at any convenient temperature of from 0 to 100° C., preferably 20 to 80° C., although it is normally preferred to effect the separation at a temperature as low as possible. The upper aqueous layer contains only about 5 to 10% of epichlorhydrin therein and the lower phase is substantially pure epichlorhydrin, usually containing less than 1.5% of water. In executing the process of the invention, the epichlorhydrin layer is returned intermittently or continuously to the reaction mixture. The upper aqueous layer is removed continuously or intermittently from the separator. By subjecting the collected aqueous layer to distillation, preferably immediately upon collection, the epichlorhydrin therein can be recovered.

Another method for recovering epichlorhydrin from the aqueous layer is subjecting the latter to extraction with a suitable solvent, e. g. with toluene. By distilling the resulting extract the epichlorhydrin can be recovered.

The process of the invention is applicable for efficient production of glycidyl ether of any suitable polyhydric phenols. Typical phenols include resorcinol, hydroquinone, methyl resorcinol, phloroglucinol, 1,5-dihydroxynaphthalene, 4,4'-dihydroxydiphenyl, bis(4-hydroxyphenyl)methane, 1,1-bis(4-hydroxyphenyl)ethane, 1,1-bis(4-hydroxyphenyl)isobutane, 2,2-bis(4-hydroxyphenyl)propane which is termed bis-phenol hereinafter for convenience, 2,2-bis(4-hydroxyphenyl)butane, 2,2-bis(4-hydroxy-2-methylphenyl)propane, 2,2-bis(2-hydroxy-4-tertiarybutylphenyl)propane, 2,2-bis(2-hydroxyphenyl)propane, 2,4'-dihydroxydiphenyldimethylmethane, 2,2-bis(2-chloro-4-hydroxyphenyl)propane, 2,2-bis(2-hydroxynaphthyl)pentane, 2,2-bis(2,5-dibromo-4-hydroxyphenyl)butane, 4,4'-dihydroxybenzophenone, 1,3-bis(4-hydroxyphenyloxy)-2-hydroxypropane, 3-hydroxyphenyl salicylate, 4-salicoylamino-phenol, as well as more complex polyhydric phenols such as novolac resins obtainable by acid catalyzed condensation of phenol, p-cresol, or other substituted phenols with aldehydes such as formaldehyde, acetaldehyde, crotonaldehyde, etc.; condensates of phenols with cardanol such as described in U. S. Patent 2,317,607; condensates of phenols with aliphatic diols such as described in U. S. Patent 2,321,620; and condensates of phenols with unsaturated fatty oils such as described in U. S. Patent 2,031,586. The polyhydric phenols contain 2 or more phenolic hydroxyl groups in the average molecule thereof and are free of other functional groups which would interfere with formation of the desired glycidyl ethers.

The epichlorhydrin employed in the process is not only a reactant, but it is also a solvent for the polyhydric phenol and the resulting glycidyl ether of the phenol. The polyhydric phenol is first mixed with and dissolved in at least about 3 moles of epichlorhydrin per phenolic hydroxyl equivalent of polyhydric phenol. The phenolic hydroxyl equivalent of the polyhydric phenol is the unit weight of the phenol per phenolic hydroxyl group therein. Thus the phenolic hydroxyl equivalent of bis-phenol is 114 weight units since the compound contains two phenolic hydroxyl groups per molecule and has a molecular weight of 228. Similarly, a condensate of cardanol and phenol has a molecular weight of 438 and shows by analysis to contain 2.5 phenolic hydroxyl groups per average molecule so it has a phenolic hydroxyl equivalent weight of 176.

If desired the reaction mixture consisting of a polyhydric phenol and epichlorhydrin may also contain inert solvents, for instance toluene or xylene. Owing to these inert solvents the separation of the azeotropic mixture distilled off as well as the final removal of the alkali metal salt formed would be facilitated.

Besides functioning as a solvent, the excess epichlorhydrin contained in the reaction mixture suppresses the tendency of the forming glycidyl ether to form polymeric condensates with dihydric phenols as well as gelled or infusible products with phenols containing more than two hydroxyl groups by cross-linking. Usually the process is executed with use of about 5 to 12 mols of epichlorhydrin per phenolic hydroxyl equivalent of the polyhydric phenol. Larger quantities can be used if desired, such as up to 15 mols or higher, but they give no particular advantage and are generally not employed because it is essential that all the unreacted epichlorhydrin be recovered as a matter of economy.

The alkali metal hydroxide, such as sodium or potassium hydroxide, is added to the reaction mixture as an aqueous solution which contains at least about 15% by weight up to the saturation concentration of the hydroxide. It has been found convenient to use a solution containing about 40% of the hydroxide. Ordinary 48° Bé. commercial caustic soda is also suitable.

The quantity of water added to the reaction mixture by the introduction of the aqueous alkali metal hydroxide solution may be kept small by using a concentrated caustic alkali solution the concentration of which may be very high, if a solution of increased temperature is applied.

The total amount of alkali metal hydroxide added is about one mol per phenolic hydroxyl equivalent of the polyhydric phenol. This amount is sufficient to combine with and neutralize the hydrogen chloride liberated by the reaction between the epichlorhydrin and the phenol. Rather than using exactly the one mol quantity, it is preferable to use a slight excess such as a 2% excess, and in some cases, up to a 5% excess. Large excesses should be avoided since they cause loss of epichlorhydrin to unwanted by-products.

After all of the alkali metal hydroxide has been added, the distillation operation with separation of water may be continued until water ceases to come off and the reaction mixture becomes anhydrous or substantially so. The unreacted epichlorhydrin is then removed by distillation. This is conveniently accomplished by simply continuing the heating, but with drawing off and collection of the condensed epichlorhydrin rather than returning it to the reaction mixture. The bulk of the epichlorhydrin is removed from the reaction mixture in this manner at ordinary atmospheric pressure. The last amount of the epichlorhydrin is removed by heating the residue up to about 150 to 200° C. under subatmospheric pressure such as about 1 to 50 mm. Hg.

In order to remove the formed alkali metal chloride from the glycidyl ether product with which it is mixed, there is added to the mixture a liquid which is a solvent for the glycidyl ether, but a non-solvent for the alkali metal chloride as is the case, for example, with benzene, toluene or xylene. The solvent is used in amount of about one-half to twice the weight of the product-salt mixture. The alkali metal chloride which precipitates from solution of glycidyl ether is removed by filtration. In order to recover all of the glycidyl ether from the filtered precipitate, the salt cake may be washed with additional solvent and the washings combined with the filtrate. The filtrate may next be washed with water to insure removal of any water-soluble impurities although this operation is ordinarily not essential. The solvent is removed from the filtrate by distillation, the last part of which is preferably effected by heating to about 150 to 200° C. with application of vacuum down to a pressure of about 1 to 25 mm. Hg. pressure.

Instead of adding a solvent to the product-salt mixture to enable removal of salt, it has also been found possible to simply filter the crude mixture before removal of epichlorhydrin provided the mixture is substantially anhydrous. In this case, the solution of glycidyl ether product in epichlorhydrin which has been freed of salt is then subjected to distillation for removal of epichlorhydrin.

The glycidyl ether product prepared by the process of the invention and obtained as residue after the salt removal operation is sufficiently pure that it need not be distilled before use. In fact, it is not practicable to distill the products even in vacuo with the possible exception of the glycidyl ether of the lower molecular weight phenols owing to their high boiling point. Analysis of the product indicates that a predominant majority such as about 80 and 95 or more percent of the hydrogen atoms of the phenolic hydroxyl groups of the original polyhydric phenol are replaced with glycidyl radicals. The hydrogen atoms of the remaining phenolic hydroxyl groups are replaced with 2,3-dihydroxypropyl and 3-chloro-2-hydroxypropyl groups in apparently about equal amounts.

The glycidyl ether products of the invention which are either viscous liquids or solids, are very useful substances. Upon addition thereto of epoxy resin curing agents such as amines, polybasic acids or anhydrides, with or without heating, they cure to valuable resinous products. Upon addition of less than the equivalent amount of a dihydric phenol to the glycidyl ether of a dihydric phenol and heating of the mixture, useful epoxy resins of higher molecular weight are obtained.

The following examples are given for the purpose of illustrating the invention and its advantage of high yield. The parts are by weight.

Example I

The process of the invention was used to prepare a product which consisted predominantly of diglycidyl diether of bis-phenol. The apparatus employed was a heated reaction vessel equipped with a thermometer, mechanical stirrer, dropping device for admitting aqueous caustic, and a vapor take-off to which was fitted a water-cooled condenser with a head thermometer and a condensate collection and separating chamber provided with a return to convey the lower epichlorhydrin layer to the reaction vessel. The separating chamber also had a draw-off and collector for the upper water layer.

The reaction vessel was charged with 1388 parts (15 mols) of epichlorhydrin and 342 parts (1.5 mols) of bisphenol. The stirrer was started and the solution of bis-phenol in epichlorhydrin was heated to 119° C. whereupon the epichlorhydrin began refluxing at a head temperature of 112 °C. During a period of 3½ hours, 304 parts of 40% aqueous sodium hydroxide (3.0 mols) were added to the boiling reaction mixture. The rate of addition of the aqueous caustic and the heating of the reaction mixture were controlled so that the temperature of the reaction mixture was between 99 and 119° C., and the head temperature was from 95 to 114° C. All during the reaction, water and epichlorhydrin were distilled from the reaction mixture. The condensed distillate was collected and separated. The upper aqueous layer thereof was removed from the separator and collected. The lower epichlorhydrin layer was continually returned to the reaction mixture as rapidly as possible. All during the addition, the concentration of water in the reaction mixture was thereby maintained at about 1%. Heating was continued an additional 15 minutes after all the caustic was added in order to complete the removal of water from the reaction mixture. A total of 248.7 parts of aqueous layer was separated and collected which analyzed as containing 14.9 parts of epichlorhydrin recoverable by distillation. The reaction mixture was then subjected to distillation for removal of unreacted epichlorhydrin. The mixture was first heated to 150° C. with distillation therefrom of epichlorhydrin at atmospheric temperature and was then heated to 200° C. at a pressure of 2 mm. for final recover of epichlorhydrin. Epichlorhydrin in amount of 1086 parts was recovered in this manner. Some 8 parts of epichlorhydrin was unaccounted for.

In order to separate salt from the crude product, approximately 550 parts of toluene was added with stirring and the mixture was filtered, the salt cake being washed with additional toluene and the washing conbined with the filtrate. The mixture was then subjected to distillation for removal of toluene, the mixture being heated to a temperature of 170° C. at 2 mm. pressure. The resulting viscous product, obtained in amount of 509 parts, had a Durrans' Mercury Method softening point of 6° C., had an epoxy value of 0.519 epoxy equivalents per 100 grams, and contained 0.52% chlorine.

In the production of the 509 parts of product, there was used a total of 286 parts of epichlorhydrin which was in the product and was not recovered or recoverable, that in the aqueous phase being recoverable. The yield of product was therefore 96.9% based upon the epichlorhydrin.

Example II

As will be evident, the yield of product from epichlorhydrin is less when produced in the manner described in U. S. Patent 2,467,171. To a reaction vessel equipped with a thermometer, mechanical stirrer and dropping device for introduction of aqueous caustic, there were introduced 912 parts (4 mols) of bis-phenol and 2220 parts (24 mols) of epichlorhydrin. To the solution were added slowly with stirring 1280 parts of 20% aqueous sodium hydroxide (8 mols) with increase of the reaction mixture temperature from 56° C. up to and at 70° C. during a period of 108 minutes. The rate of addition of the caustic was effected gradually so that the reaction mixture did not become strongly basic at any time. Upon completion of the addition, the reaction mixture was maintained at 70° C. for an additional 27 minutes. The reaction mixture was then transferred to a separator, and at ordinary temperature of about 20° C., 2397 parts of upper layer were separated. In order to insure removal of all the product from the aqueous lower layer containing the formed salt, it was washed with separate portions of 363 parts and 275 parts of methyl isobutyl ketone, and the washings were combined with the upper layer to give a total of 3434 parts. The aqueous layer amounted to 1874 parts and was found by analysis to contain 42 parts of epichlorhydrin recoverable by distillation. The upper layer was distilled, first at atmospheric pressure and then with heating up to 175° C. at 2 mm. pressure so as to recover 1411 parts of product and 1301 parts of epichlorhydrin. The resulting product was a viscous liquid that had a Durrans' Mercury Method softening point of 13° C., had an epoxy value of 0.388 equivalents per 100 grams and contained 4.06% chlorine.

There was used a total of 877 parts of epichlorhydrin so the yield of product was only 87.8% based upon the epichlorhydrin. Furthermore, the chlorine content of the product was high and the epoxy value low.

Example III

The yield of product from epichlorhydrin was also less when prepared as described in U. S. Patent 2,631,138. The preparation was effected in a kettle provided with heating and cooling equipment, mechanical agitator, distillation condenser and distillate receiver. Epichlorhydrin in amount of 320 parts (3.46 mols) was charged to the kettle and 79.1 parts (0.347 mol) of bis-phenol and 1.6 parts of water were introduced with stirring. The temperature of the resulting solution was raised to about 75° C. and a 4.874 parts portion of a total of 29.0 parts (0.706 mol, 2% excess) of solid flaked 97.5% sodium hydroxide was added whereupon the temperature rose to about 105° C. with gentle distillation so some cooling was required. The temperature gradually fell to about 97° C. and distillation ceased. An additional 4.874 parts of the sodium hydroxide were added. Again the temperature rose so gentle distillation occurred and cooling was required to keep the temperature from exceeding about 105° C. This procedure was repeated until all the sodium hydroxide was added. The temperature did not increase when the last portion of sodium hydroxide was added so heating was applied until the temperature reached 110° C. About 15 parts of distillate were collected which consisted largely of epichlorhydrin, but contained part of the water of reaction. Heating was then continued with distillation of epichlorhydrin and reaction water from the reaction mixture at atmospheric pressure. This distillate was combined with the first distillate so that a total of 77.5 parts of epichlorhydrin were collected at this point. The pressure on the kettle was then lowered to 50 mm. Hg and the temperature increased up to 150° C. for final removal of the remaining epichlorhydrin. Again the distillate was combined with the earlier collections to give a total of 252.2 parts, of which an aqueous layer of 11.5 parts separated and was decanted. The aqueous layer contained about 0.7 part of epichlorhydrin which could have been recovered by distillation. The separated epichlorhydrin layer contained about 237 parts of epichlorhydrin so a total of 237.7 parts were recoverable.

After allowing the crude product (distillation residue) to cool to about 90° C., 56 parts of benzene were added to precipitate the salt upon cooling to about 40° C. whereupon the salt was removed by filtration. The salt cake was washed with another 56 parts of benzene and the washing combined with the filtrate. The benzene was removed from the product by distillation up to a temperature of 170° C. at 25 mm. pressure and 108.3 parts of viscous liquid product were obtained. The product had a Durrans' Mercury Method softening point of 9.5° C., had an epoxy value of 0.516 equivalents per 100 grams and contained 0.37% chlorine.

Since there was used a total of 82.3 parts of epichlorhydrin to obtain 108.3 parts of product, the yield of product based upon epichlorhydrin was 71.7%.

*Example IV*

The process of the invention substantially as described in Example I was repeated except for use of a 2% excess of sodium hydroxide. The reaction vessel was charged with 1388.5 parts of epichlorhydrin and 342 parts of bis-phenol. The solution was stirred and heated to 118° C. with epichlorhydrin refluxing at a head temperature of 110° C. Over a period of 5¼ hours, 312 parts of a 40% aqueous solution containing 125 parts of sodium hydroxide were added. During the addition, the kettle temperature was maintained between 104 and 117° C., and the head temperature between 95 and 115° C. by regulation of the heating and rate of caustic addition. There was vigorous distillation and the condensed distillate was collected and separated. The epichlorhydrin layer was continually returned to the reaction mixture while the aqueous layer was collected. During the period of addition, the concentration of water in the reaction mixture was thereby maintained between about 0.5 and 1.0 percent. The heating and distillation were continued for an additional 15 minutes to complete the reaction and removal of water. The unreacted epichlorhydrin was then removed by distillation and the product freed of salt with toluene as described in Example I. Some 502 parts of product were produced. The total aqueous layer collected was 255.0 parts which analyzed as containing 15.1 parts of epichlorhydrin which could have been recovered by distillation. The epichlorhydrin recovered by distillation from the product-salt mixture was 1081.3 parts and the epichlorhydrin unaccounted for was 18.0 parts. The yield of product was therefore 93.6% based upon the epichlorhydrin. The product was a viscous liquid that had a Durrans' Mercury Method softening point of 8° C., had an epoxy value of 0.530 equivalent per 100 grams and contained 0.25% chlorine.

*Example V*

The procedure described in Example IV was repeated up to the point of completion of the reaction and dehydration of the crude reaction mixture. The mixture of glycidyl ether product, epichlorhydrin and salt was filtered, once through Celite and No. 2 paper and again through a double sheet of No. 2 paper. The filtrate was then stripped of epichlorhydrin up to a temperature of 155° C. at 3 mm. pressure. The resulting product was a viscous liquid that had a Durrans' Mercury Method softening point of 11° C., had an epoxy value of 0.517 equivalent per 100 grams and contained 0.43% chlorine.

*Example VI*

The glycidyl ether was prepared from a polyhydric phenol sold as Cardolite 6463 by the Irvington Varnish and Insulator Co. which was a condensate of phenol with cardanol. The polyhydric phenol had a molecular weight of 438 and a phenolic hydroxyl equivalent weight of 176. It therefore contained 2.5 phenolic hydroxyl groups per mol.

A solution of 448 parts of Cardolite 6463 dissolved in 1140 parts of epichlorhydrin was placed in a reaction vessel fitted with a dropping device and a condenser equipped with a separating head to permit removal of water. A solution of 105 parts of sodium hydroxide in 150 parts of water was prepared and 5 parts thereof were added to the epichlorhydrin solution. The mixture was heated to refluxing temperature and the caustic solution was added with stirring during a period of 90 minutes. The water was removed from the reaction mixture continuously at the separating head while keeping the temperature of the reaction mixture at 105–113° C. and the head at 99–100° C. After completion of the addition, refluxing was continued for 30 minutes and then the excess epichlorhydrin was removed from the reaction product by distilling to a temperature of 155° C. Toluene was added to the reaction product to precipitate the salt which was removed by filtration. The toluene was then distilled from the product with heating to 155° C. at 2 mm. pressure. The formed glycidyl ether in amount of 517 parts was a viscous syrup which analyzed as follows:

| | |
|---|---|
| Molecular weight | 568 |
| Epoxide equivalents per 100 gms | 0.325 |
| Epoxide equivalents per mol | 1.84 |
| Hydroxyl equivalents per 100 gms | 0.077 |
| Chlorine, percent | 0.93 |

I claim as my invention:

1. A process for production of glycidyl ether of a polyhydric phenol which comprises adding an aqueous solution of alkali metal hydroxide containing at least 15% by weight of the hydroxide to an agitated solution of a polyhydric phenol in at least about 3 mols of epichlorhydrin per phenolic hydroxyl equivalent of the phenol while simultaneously distilling water and epichlorhydrin from the reaction mixture with condensation of the distilled vapors as distillate which is separated into two liquid phases, and returning only the epichlorhydrin rich lower layer to the reaction mixture, the rate of addition of the hydroxide solution and the rate of distilling being regulated so that the concentration of water in the reaction mixture is maintained at about 0.3 to 2% by weight during the course of the reaction, and the total amount of hydroxide added being from about 1 to 1.05 mols per phenolic hydroxyl equivalent of the phenol.

2. A process as defined by claim 1 wherein the polyhydric phenol is a dihydric phenol.

3. A process as defined by claim 1 wherein the polyhydric phenol is 2,2-bis(4-hydroxyphenyl)propane.

4. A process as defined by claim 1 wherein the polyhydric phenol is a novolac resin which is the condensate of phenol and formaldehyde.

5. A process as defined by claim 1 wherein the polyhydric phenol is the condensate of phenol with cardanol.

6. A process for production of glycidyl ether of a dihydric phenol which comprises adding an aqueous solution of sodium hydroxide containing from about 15% by weight up to the saturation concentration of the hydroxide to an agitated solution of a dihydric phenol dissolved in about 5 to 12 mols of epichlorhydrin per phenolic hydroxyl equivalent of the phenol while simultaneously distilling water along with epichlorhydrin from the reaction mixture with condensation of the distilled vapors as distillate whch is separated into two liquid layers, and returning only the epichlorhydrin rich lower layer to the reaction mixture substantially as fast as collected, the rate of addition of the hydroxide solution and the rate of distilling being so regulated that the concentration of water in the reaction mixture is maintained at about 0.5 to 1% by weight during the course of the reaction, and the total amount of sodium hydroxide added being from about 1 to 1.05 mols per phenolic hydroxyl equivalent of the phenol.

7. A process as defined in claim 6 wherein the dihydric phenol is 2,2-bis(4-hydroxyphenyl)propane.

8. A process for production of glycidyl ether of 2,2-bis(4-hydroxyphenyl)propane which comprises adding an aqueous solution of sodium hydroxide containing from about 40% by weight up to the saturation concentration of the hydroxide to a heated solution initially containing one mol of 2,2-bis(4-hydroxyphenyl)propane in about 10 mols of epichlorhydrin while simultaneously distilling water along with epichlorhydrin from the reaction mixture with condensaton of the distilled vapors as distillate which is separated into two liquid phases at about 20 to 80° C., and returning only the epichlorhydrin rich lower phase to the reaction mixture substantially as fast as formed, the rate of addition of the hydroxide solution and the rate of distilling being so regulated that the concentration of water contained in the reaction mixture during the addiion is maintained at about 0.3 to 2% by weight, and the total amount of sodium hydroxide added being from about 1 to 1.02 mols per phenolic hydroxyl equivalent of the phenol.

References Cited in the file of this patent

UNITED STATES PATENTS

| | | |
|---|---|---|
| 2,191,957 | Edgar et al. | Feb. 27, 1940 |
| 2,467,171 | Werner et al. | Apr. 12, 1949 |
| 2,508,875 | Scott | May 23, 1950 |
| 2,631,138 | Dannenberg | Mar. 10, 1953 |
| 2,716,099 | Bradley et al. | Aug. 23, 1955 |